Inventor:
David G. Way,
by Albert Hauer, Attorney

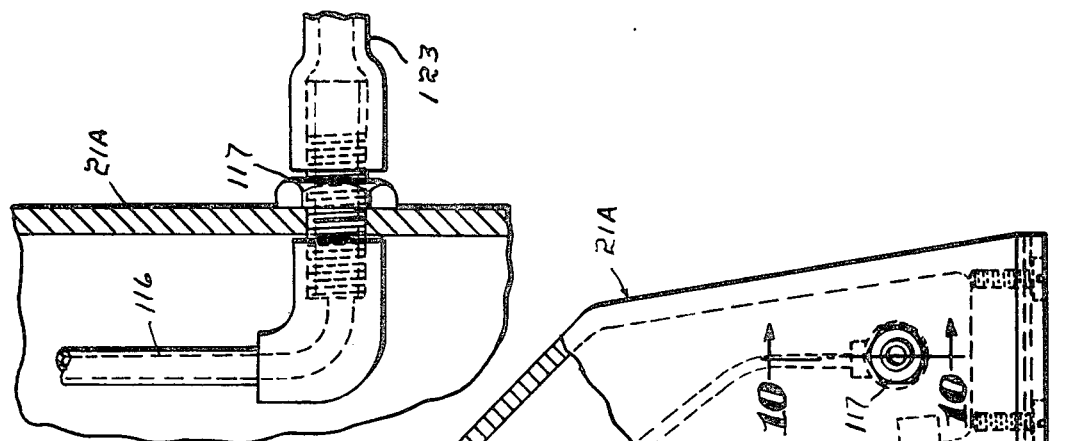
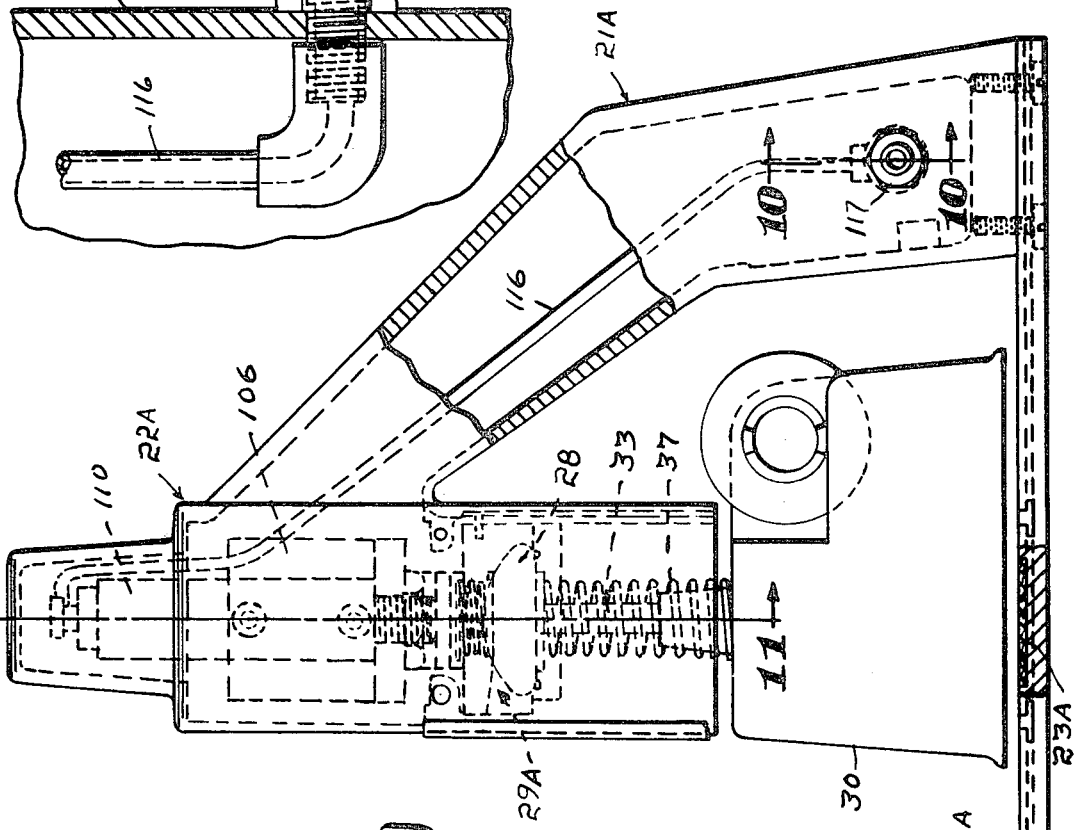
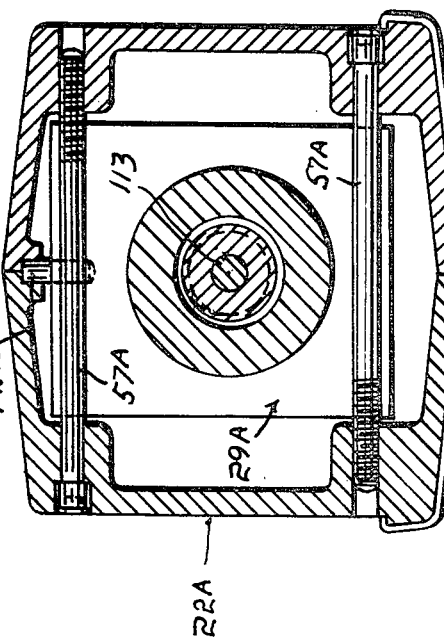
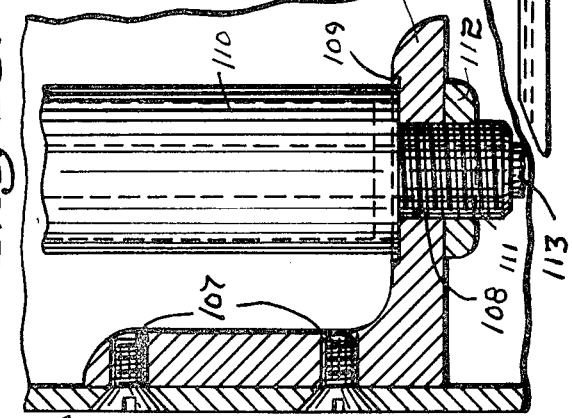

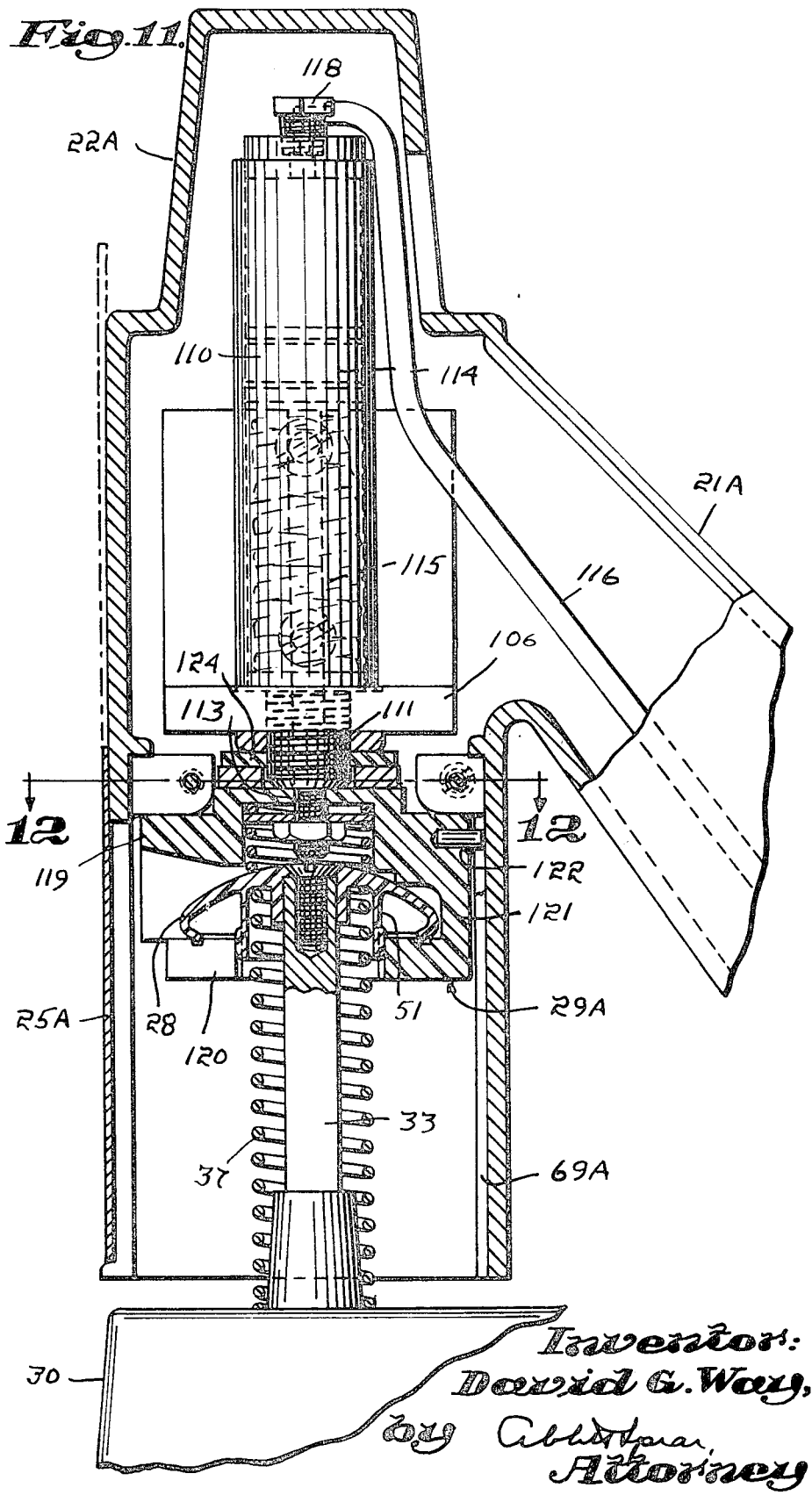

United States Patent Office 3,649,413
Patented Mar. 14, 1972

3,649,413
POWER OPERATED APPARATUS FOR DELIVERING PREDETERMINED LENGTHS OF AN ADHESIVE TAPE TO AN ARTICLE
David G. Way, Boxborough, Mass., assignor to Tapeler Corporation, Newton, Mass.
Filed July 31, 1969, Ser. No. 846,437
Int. Cl. B32b *31/18*
U.S. Cl. 156—518                  17 Claims

ABSTRACT OF THE DISCLOSURE

Apparatus is disclosed consisting of the combination of a device for applying to an article a tape section of a predetermined length from a roll of an adhesive tape and a support for the device. The support has a carrier to which the actuator of the device is connected and which is reciprocated by power operated means between a first carrier position in which the device is unseated and a second carrier position in which the device is seated and operated. The connection between the carrier and the actuator is preferably a detachable swivel. Air and electrically operated embodiments of the apparatus are disclosed.

---

Figure 1:
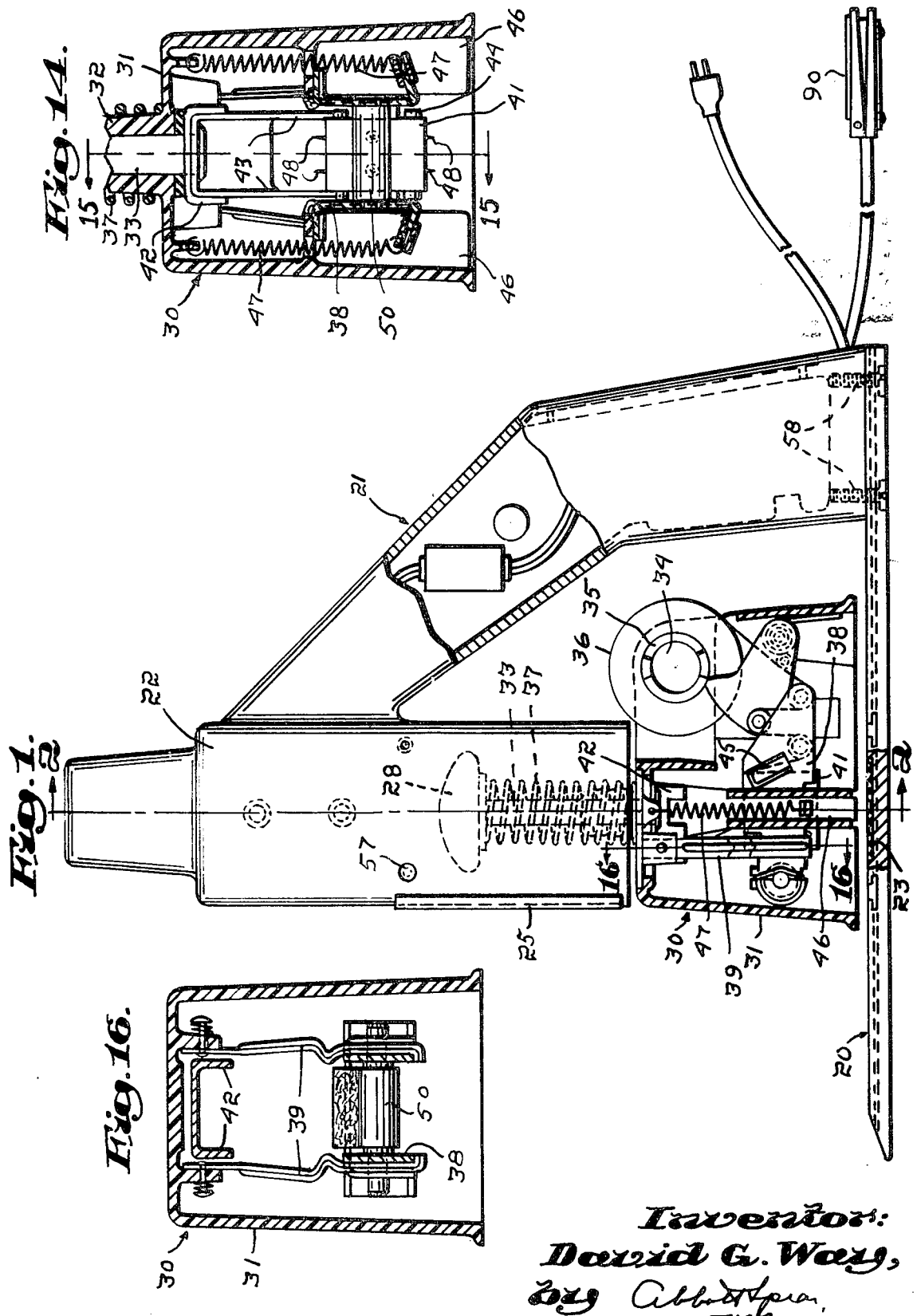

The present invention relates to power operated apparatus to apply a predetermined length or section of tape from a roll of adhesive tape.

In Letters Patent No. 3,455,769, there are disclosed devices for applying to articles tape sections of a predetermined length from a roll of tape having at least one face coated with an adhesive. The devices are of a type having means providing a severed tape section of predetermined length and reciprocable into and out of a position in which the tape section is applied to a subjacent surface, said means includes an actuator having a section-forming and section-applying stroke and operable when the device is seated.

While such devices are well adapted for many purposes, the manual operations of positioning such a device to place the tape section where wanted on an article, depressing its actuator to provide a severed tape length and to apply that section to the article, and finally removing the device from the article limit their acceptance when the rate of application of the tape sections or convenience to the operator are important factors.

The general objective of the present invention is to provide power operated means enabling the above summarized sequence of operations to be automatically performed with such a device, an objective attained by providing a work support with a carrier and with reciprocating means connected to the carrier. The actuator of the device is connected to the carrier and the reciprocating means is operable to effect a first carrier position in which the device is unseated to enable an article to be placed on the support in a position to receive a tape section or remove it therefrom and a second carrier position in which the device is seated and its actuator moved through a tape section-forming and tape section-applying stroke.

Another objective of the invention is to provide a swivel connection between the carrier and the actuator of the device thereby to enable the device to be turned to insure the desired lay of the applied tape sections, the swivel connection desirably providing a detent in each of a substantial number of positions into which the device may be turned, the carrier being non-rotatable.

Another objective of the invention is to provide a connection between the carrier and the actuator of the device that enables a device to be quickly and easily removed for use elsewhere or serviced and as readily replaced.

Other objectives are concerned with features of electrically operated and air operated embodiments and the control of the operating power.

In the accompanying drawings, there are shown embodiments of the invention illustrative of these and other of its objectives, novel features, and advantages.

Figure 2:
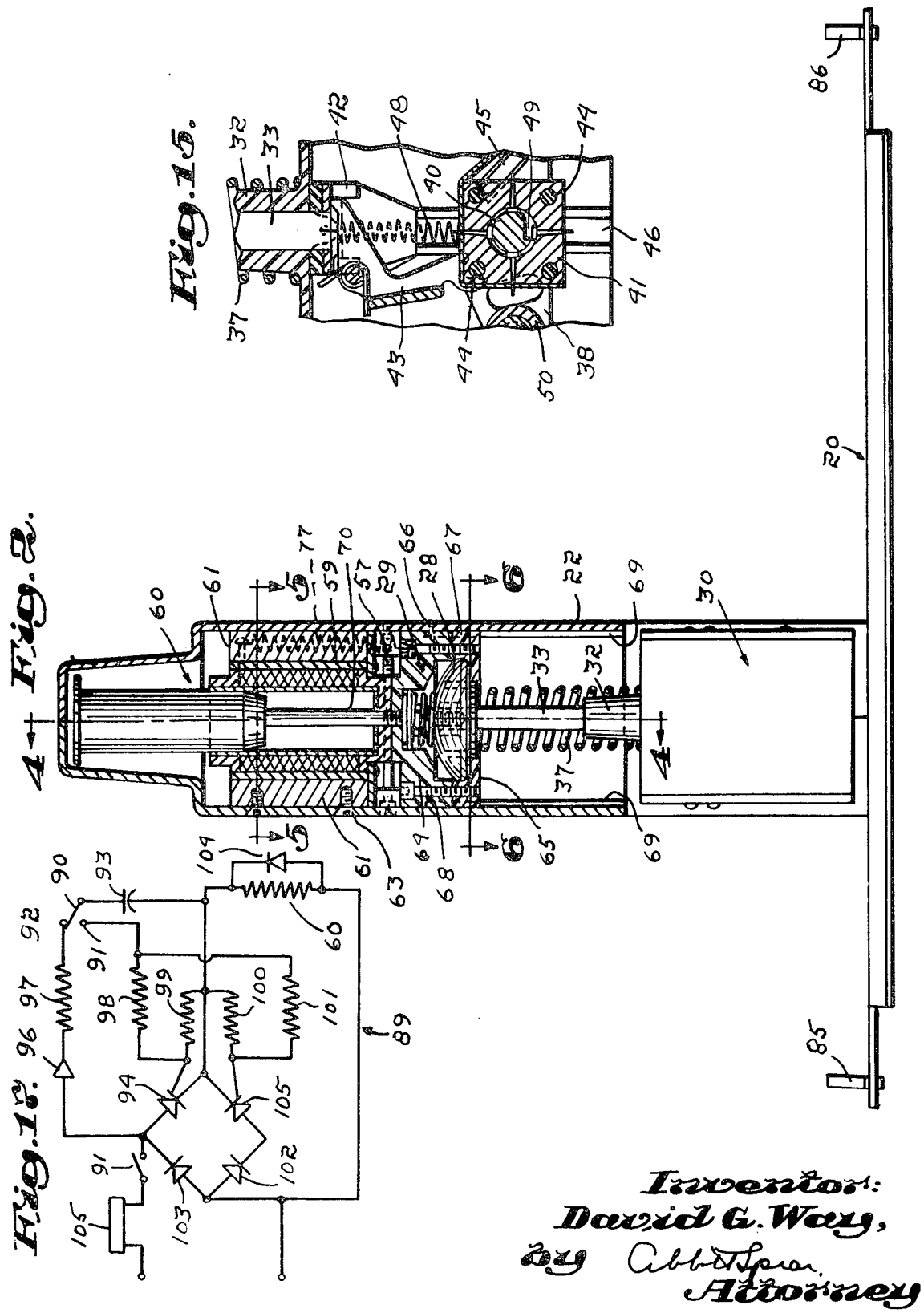
Figure 3:
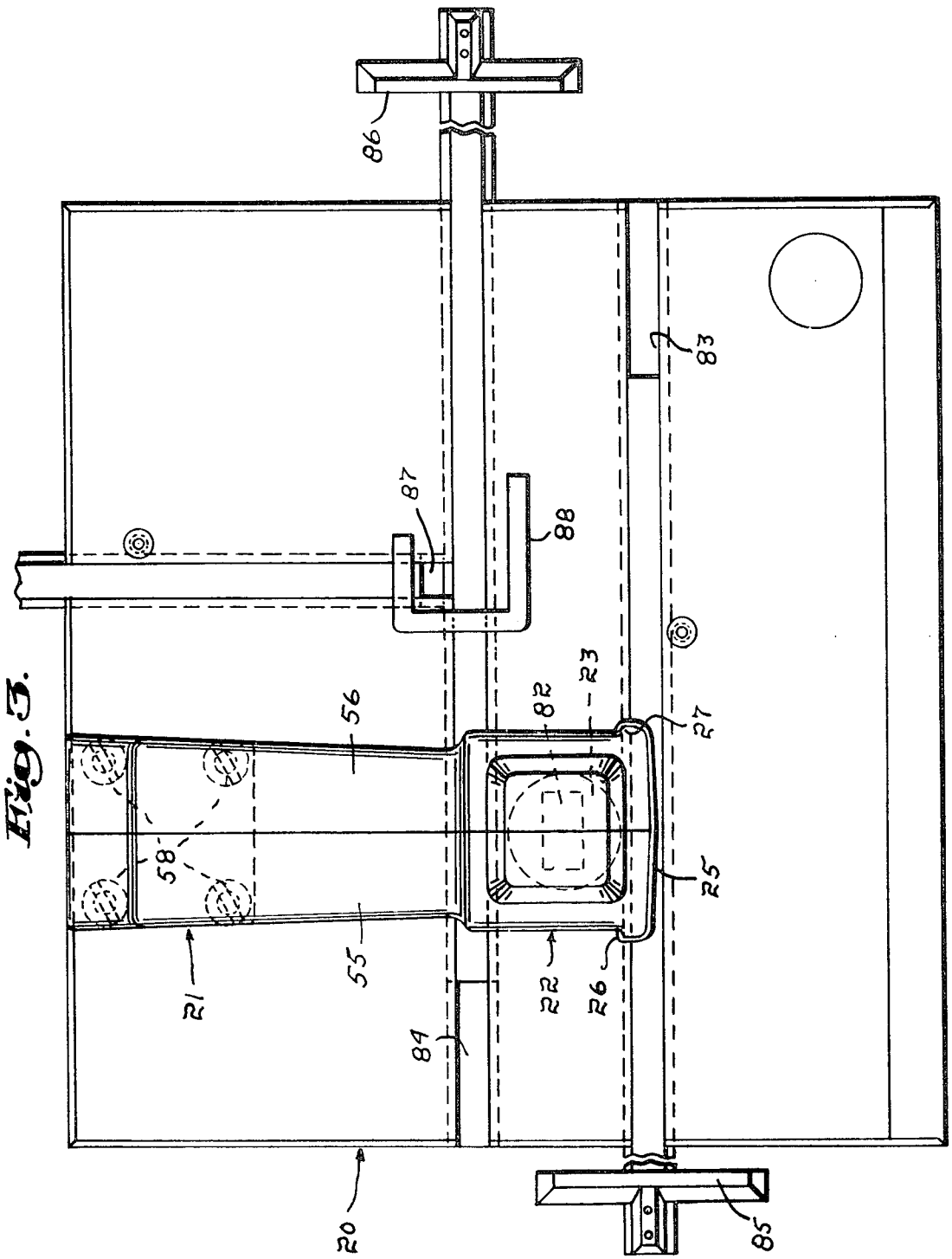
Figure 4:
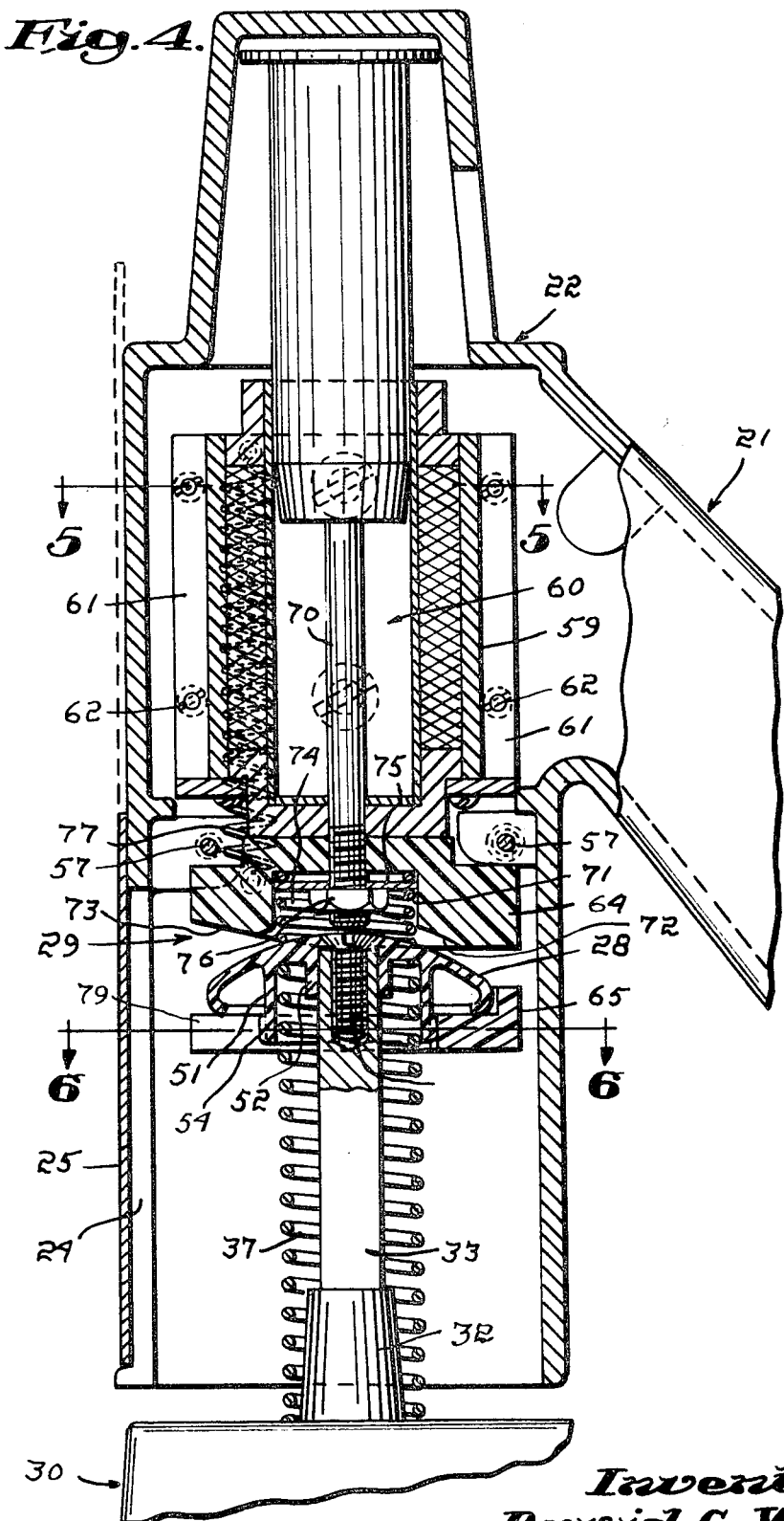
Figure 5:
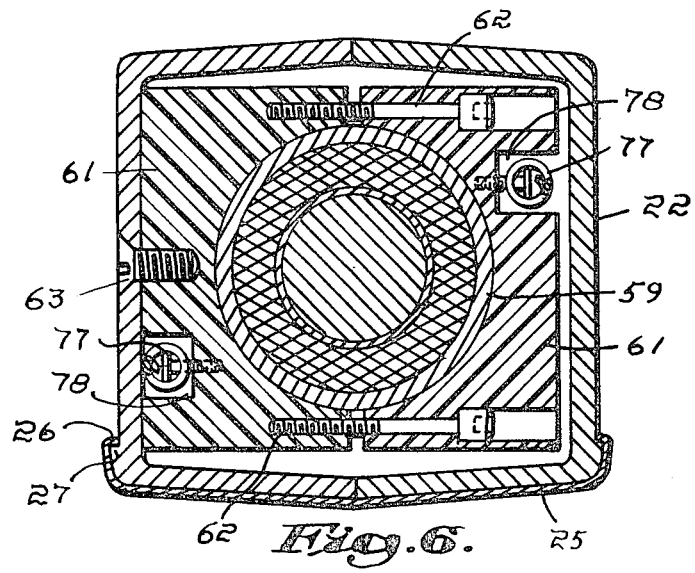
Figure 6:
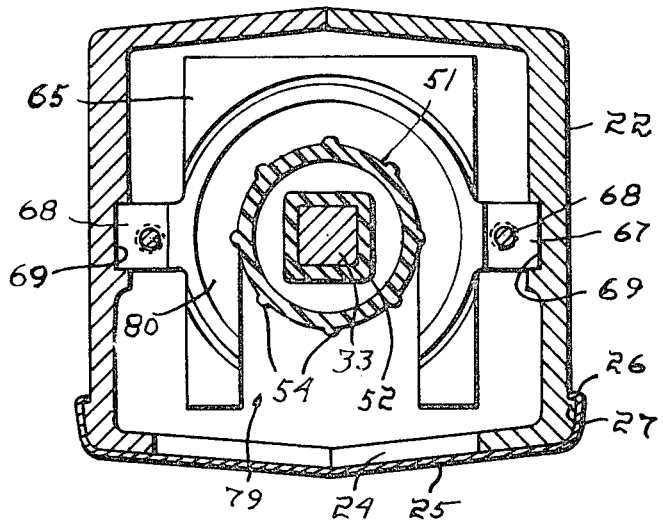
Figure 7:
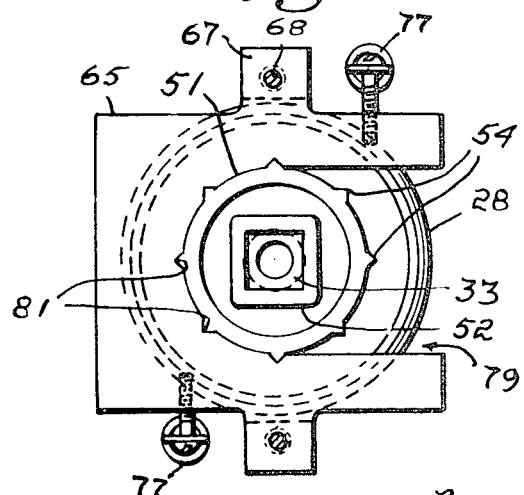
Figure 8:
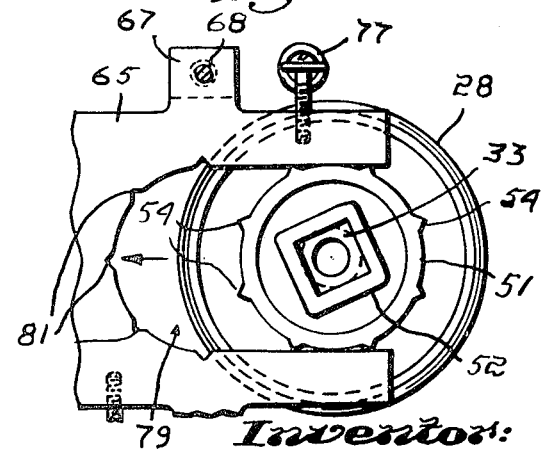

In the drawings:

FIG. 1 is a partly sectioned side view of an electrically operated tape-applying apparatus in accordance with the invention with the tape-applying device attached thereto, FIG. 2 is a partly sectioned view of the apparatus taken approximately along the indicated lines 2—2 of FIG. 1, FIG. 3 is a top plan view of the apparatus, FIG. 4 is a section, on an increase in scale, taken approximately along the indicated lines 4—4 of FIG. 2, FIG. 5 is a section taken approximately along the indicated lines 5—5 of FIG. 4, FIG. 6 is a section taken approximately along the indicated lines 6—6 of FIG. 4, FIG. 7 is a bottom plan view of the lower part of the carrier with the knob of the device supported thereby, FIG. 8 is a like view but with the hub of the knob being entered into the carrier, FIG. 9 is a partly section view of a tape-applying apparatus in accordance with another embodiment of the invention, the apparatus being air-operated, FIG. 10 is a fragmentary view, on an increased scale taken approximately along the indicated lines 10—10 of FIG. 9, FIG. 11 is a fragmentary section, on an increase in scale, taken approximately along the indicated lines 11—11 of FIG. 9, FIG. 12 is a section taken approximately along the indicated lines 12—12 of FIG. 11, FIG. 13 is a fragmentary section, showing the supporting bracket for the air cylinder, FIG. 14 is a fragmentary vertical section taken transversely of the tape section-applying device through the vertical guide channels for its frame, FIG. 15 is a fragmentary vertical section taken approximately along the indicated lines 15—15 of FIG. 14, FIG. 16 is a fragmentary vertical section taken approximately along the indicated lines 16—16 of FIG. 1, and FIG. 17 is a schematic view of the operating circuitry for the embodiment of the invention illustrated by FIGS. 1–8.

In the embodiment of the invention illustrated by FIGS. 1–8 and 17, a flat-surfaced base 20 has, rearwardly of its work-supporting area, a hollow support 21 secured thereto and positioning a vertical, downwardly opening housing 22 above a cushion 23 inserted in the base 20. The housing 22 is shown as substantially rectangular in cross section and has a doorway 24 opening at the front through its bottom edge and closed by a door 25 having inturned margins 26 slidably caught behind shoulders 27, one extending upwardly along each side of the housing 22, see FIGS. 4, 5, and 6, permitting the door to be slid upwardly to enable the knob 28 of the device for applying tape sections to be attached to the generally indicated carrier 29 in a manner presently to be detailed.

The device is generally indicated at 30 and while shown as made in accordance with Letters Patents No. 3,455,769, it is herein detailed to an extent enabling the present invention to be readily appreciated, see FIGS. 1, 14, 15, and 16. The device 30 has a housing 31 having an upwardly disposed boss 32 through which an actuating stem 33 of rectangular cross section extends with the knob 28 fixed on its upper end. The housing has a hub 34 rotatably supporting the core 35 of a roll of tape 36 of a pressure sensitive tape. Desirably, the hub 34 and the core 35 are of a type disclosed in the co-pending application of David G. Way, Ser. No. 798,852, filed Jan. 9, 1969. When the knob 28 is depressed to the maximum extent against the action of the return spring 37, a tape section of predetermined length and usually oblong is deposited on the subjacent surface.

A frame 38 within the housing 31 is releasably held by hangers 39 and has an axle 40 rotatably supporting a feed block 41. As the knob 28 is pushed downwardly, the hangers 39 are wedged apart by the sides of a stop 42, fixed on the stem 33, after the feed block 41 has been turned a quarter turn counter clockwise as the device 30 is seen in the drawings, as by pawls 43 carried by the stop 42 coacting with pins 44 at the corners of the block 41. Clockwise rotation of the feed block 41 is prevented by a yieldable, pin-engaging latch 45. After the frame is released, it is movable along the vertical path defined by its guide channels 46, upwardly by the springs 47 and downwardly when engaged by the sides of the stop 42. The tape from the tape roll 36 is trained about guide rollers and part way about the feed block 41, sticky side out. The feed block 41 has headed pins 48, shown as extending outwardly through each face and backed by the axle 40 except when a feed block face is downwardly disposed, the axle having a cam recess 49 then permitting the pins 48 to recede. The frame 38 also supports a rotatable anvil 50 in a position to be engaged by a tape-covered corner of the feed block 41 during each quarter turn and to sever the tape against the cutting edge that each corner establishes thus to provide a severed tape section held by the pins 48 until pressed against a subjacent surface.

It will be noted that the knob 28, see FIG. 4, has a downwardly disposed, hollow hub 51 dimensioned to receive within it and confine the upper end of the spring 37 between it and the hub 52 having a square socket to receive the upper end of the stem 33 to which the knob 28 is secured by a screw 53. The periphery of the hub 51 has, see FIGS. 6, 7, and 8, a plurality of equally spaced projections 54 that are V-shaped in cross section.

In practice, the housing 22 and its support 21 are formed by interconnecting two complemental sections 55 and 56, see FIGS. 1, 3, and 4, by means of screws 57 extending through their housing-establishing portion and by anchoring the base of their support-establishing portions to the base 20 by means of screws 58. The casing 59 of a generally indicated solenoid 60, see FIGS. 2, 4, and 5, is held by clamp sections 61 interconnected by screws 62 with one of the clamp sections 61 attached to one of the sections of the housing 22 by screws 63. The carrier 29 includes an upper part 64 and a lower part 65 having marginal tabs 66 and 67, respectively, interconnected by screws 68 and entrant of vertically disposed guide channels 69 with which the interior of the housing 22 is provided as a means to prevent the carrier from turning.

The upper carrier part 64, as may be seen in FIG. 4, is threaded on the end of the solenoid plunger 70 with the threaded end exposed in a pocket 77 centrally of a concave seat 72 in the undersurface of the upper part 64 and the margin disposed towards the doorway 24 is upwardly and outwardly inclined as at 73. A coil spring 74 is anchored by a washer 75 locked in place by and serving as a lockwasher for a nut 76, see FIG. 4. Springs 77 connected to the upper carrier part 64 extend upwardly in channels 78 in the clamp sections 61 and each is attached to the upper part of an appropriate one of them.

The lower carrier part 61 has a slot 79 opening towards the doorway 24 and dimensioned to enable the hollow hub 51 of the knob 28 to be slid into a position in which the axis of the stem 33 is in registry with the axis of the solenoid plunger 70, the knob 28 then being supported in a shallow seat 80, see FIG. 6. It will be noted that the end of the slot 79 in which the hub 51 seats has a series of V-shaped notches 81 spaced and dimensioned to receive appropriate ones of the hub propections 54. At least the lower part of the carrier 65 is molded from a plastic, nylon, for example, that is sufficiently yieldable to permit the hub 51 to be entered into the slot 79 as shown in FIG. 8 and then seated as illustrated in FIG. 7 with the projection 54 then caught in the notches 81 to prevent the accidental turning of the device 30 while permitting the device 30 to be turned by the user with the notches and projections providing a detent action establishing a wide range of positions into which the device 30 my be turned and held during use.

It will be noted from FIGS. 1 and 2 that the springs 77 yieldably maintain the device 30 above the surface of the base 20 to enable a sheet or sheets to be inserted in a position on the support 20 to receive a tape section 82 and that, see FIGS. 1 and 3, the cushion 23 is dimensioned to underlie the path of the feed block 41 in any position into which the device 30 is turned relative to the carrier 29.

As an aid in positioning sheets on the support 20 in desired relationship to the device 30, the support 20 has parallel, transverse, undercut slideways 83 and 84 for side guides 85 and 86, respectively, and a like slideway 87 extending at right angles thereto through the rear edge of the support 20 for an end guide 88.

When the solenoid 60 is energized, the plunger 70 first moves the device 30 the short distance downwardly required to seat it on the work and then depresses the actuating stem 33 through its stroke by which first a tape section 82 is formed by the turning of the feed block 41 and then applied by moving the feed block to press the tape section 82 against the work. When the solenoid 60 is de-energized, the device 30 is returned to its original, elevated position to enable the work to be removed and replaced.

The solenoid 60 is desirably of the direct current type and its circuit generally indicated at 89 and detailed in FIG. 17, includes a control switch, indicated as a foot-operated switch 90. The circuit 89 desirably provides for a single cycle operation of the solenoid 60 with the current automatically broken until the switch 90 is released and again actuated. To that end, the circuit 89, connectable to an A-C power source (usually 120 volts), includes, a switch 91 which acts only as an ON-OFF device, operation of the solenoid 60 being effected by the switch 90, which is of the two-position type having terminals 91 and 92. When the switch 90 is closed with respect to the terminal 92 there is no power flow to the solenoid 60, and when the switch 90 is closed with respect to the terminal 91, there is power flow to the solenoid 60, but for a predetermined short time only.

Assume, first, that the switch 91 is closed and the switch 90 is closed with respect to the terminal 92. This connection results in charging a biasing capacitance 93, which serves as a control means for semiconductor controlled rectifiers 94 and 95, as later discussed, through a diode 96 and a current limiting resistance 97. The capacitance 93 charges to the polarity shown even though connected to an A-C source because the diode 96 provides half-wave rectification of the input. Assume that the capacitance 93 is charged and the switch 90 is now closed upon the terminal 91, the capacitance 93 dissipates its potential through series resistances 98 and 99 and series resistances 100 and 101 which act as voltage dividers for the rectifiers 94 and 95, respectively, the resistances 99 and 100 being connected between the gate and cathode electrodes of the respective rectifier to provide biasing voltage therebetween. Should the switch 90 be left closed upon the terminal 91, the voltage on the capacitance 93 will gradually dissipate to zero and at some voltage the rectifiers 94 and 95, each of which is turned off during the reverse-voltage potential from the source once each cycle, will not pass electric current to the solenoid 60. Thus, a failsafe arrangement for control of the solenoid 60 is furnished. The rectifiers 94 and 95 are part of a bridge circuit which includes also diodes 102 and 103, the rectifiers 94 and 95 acting as push-pull devices to power the D-C solenoid 60, the current in one half cycle passing through the rectifier 94 and the diode 96 and in the other half cycle through the rectifier 95 and the diode 102.

The switch 90, in operable apparatus, may be foot operated to close upon the terminal 91 and spring-loaded to close upon the terminal 92. A diode 104 serves to prevent high switching voltages across the solenoid 60. A circuit breaker is indicated at 105. A solenoid for such operable apparatus is typically adapted to function at 100 volts D-C; the capacitance 93 is 25 Mf at 150 volts D-C; and the resistances shown are typically 1000 ohms. The maximum length of time that the solenoid 60 will stay energized can be varied most readily by changing the value of the capacitance 93 or the resistances 98–101. With the exception of the solenoid 60, the switch 90, circuitry, such as is above set forth, may be mounted in the support 21.

The embodiment of the invention illustrated by FIGS. 9–13 is air operated and its parts that are the same as those of the electrically operated apparatus are designated by the suffix addition "A" to the corresponding reference numerals.

The housing 22A is provided with a bracket 106 anchored by screws 107 and having a bore 108 centrally of a seat 109 for the lower end of a cylinder 110. The cylinder 110 has a threaded hollow stem 111 extending through the bore 108. A nut 112, threaded on the stem 111 secures the cylinder 110. The rod 113 of a piston 114 extends downwardly through the stem 111 and has a carrier 29A secured thereto in the same manner as in the case of its previously detailed embodiment. The piston 114 is yieldably held in an elevated position by a spring 115. An air conduit 116 extends lengthwise of the support 21A and is secured at one end to a fitting 117, see FIG. 10, extending through a side wall of the support 21A. The conduit 116 is secured at its other end to a fitting 118 opening into the upper end of the cylinder 110.

A carrier 29A, see FIG. 11, is anchored to the threaded end of the piston rod 113. The carrier includes upper and lower portions 119 and 120 that are the same as the carrier portions 64 and 65, respectively, except that they are intergrally joined as at 121. The carrier 29A is held against rotation as by a pin 122 slidably entrant of a vertical guide channel 69A.

In operation, the door 25A is raised to enable the knob 28 of a device 30 to be slid in place in the carrier 29A and yieldably held in its elevated position by the spring 96. A conduit 123 from a source of air under pressure and controlled by a three way valve is then connected to the fitting 117. The three way valve is not shown but it may be of any type and operated in any desired manner to provide downward travel of the piston rod 113 first to seat the device 30 and then to actuate its stem 33 through its tape section-forming and section-applying stroke and then the venting of the cylinder 110 to enable the spring 115 to restore the device 30 to its elevated position with the up-stroke being against a cushioning member 124

From the foregoing, it will be appreciated that the invention provides effective means for the power operation of devices while enabling them to be detached and serviced or operated manually.

I claim:

1. In combination, a device for depositing on an article a tape section of a predetermined length from a roll of tape having at least one face coated with an adhesive, and a support for the device, said device including means providing a severed tape section of predetermined length and reciprocable into and out of a tape section-applying position, said means including an actuator having a section-forming and section-applying stroke and operable when the device is seated, said support including a carrier, a connection between said carrier and said actuator adjustable to enable the lay of the applied tape section to be manually selected, and reciprocating means connected to said carrier and providing a first carrier position in which the device is unseated to enable an article to be placed in a position to receive a tape section and a second carrier position in which the device has been seated and the actuator moved through a section-forming and section-applying stroke.

2. The combination of claim 1 in which both the carrier and the actuator are non-rotatable and the connection is a swivel.

3. The combination of claim 2 in which the actuator includes a knob and the carrier includes a part having a transverse slot of substantially T-shaped cross section and open at one end, the slot being shaped and dimensioned to slidably receive and support the knob with the closed end of the slot establishing a seated position therefor.

4. The combination of claim 3 in which the knob includes a depending hub part dimensioned for slidable entry in the slot and to seat in its closed end, the hub part and the closed end of the slot having circumferentially spaced, complemental portions coacting when the hub part is seated to provide a detent operable to hold the device against accidental turning during use from a manually selected position.

5. The combination of claim 4 in which the carrier also includes a detent spring engaging the hub to yieldably hold the knob with its hub part seated in the closed end of the slot.

6. The combination of claim 2 in which the support includes a flat-surfaced base for the support of work in the path of said means providing a severed tape section and the support includes a cushion engageable by said means providing a severed tape section in any position in which the device is turned.

7. A support for a device for depositing on an article a tape section of a predetermined length from a roll of tape having at least one face coated with an adhesive, said device being of a type having means providing a severed tape section of predetermined length and reciprocable into and out of a tape section-applying position with the means having an actuator having a section-forming and section-applying stroke and operable when the device is seated, said actuator having a knob, said support including a non-rotatable carrier having a slideway opening through one side thereof and shaped and dimensioned to receive said actuator and marginally support said knob and reciprocating means connected to said carrier and providing a first position of the carrier in which the device when attached thereto, is unseated to enable an article to be placed in a position to receive a tape section and a second carrier position in which the attached device has been seated and the actuator moved through a section-providing and applying stroke.

8. The support of claim 7 in which the support includes a downwardly opening housing enclosing the carrier and has a doorway exposing the open end of the slideway of the carrier, and a door attached to the housing normally closes the doorway.

9. The support of claim 7 in which the carrier includes upper and lower parts, the lower part having a slot open at one end with its closed end providing a seat determining the operative position for the device, the upper part being spaced above the lower part to accommodate the knob.

10. The support of claim 9 in which the upper part has a yieldable detent engageable with the knob when the device is in its operative position relative to the carrier.

11. The support of claim 9 in which the knob may be turned in the operative position of the device and the lower part includes detent portions engageable with the knob when the device is in its operative position.

12. The support of claim 7 and a flat-surfaced base including a portion underlying the path of the carrier and a cushion embedded in said base portion.

13. The support of claim 7 in which the support includes a downwardly opening housing enclosing the carrier and the reciprocating means includes a power operated device mounted within the housing and attached thereto.

14. The support of claim 7 in which said reciprocating means comprises spring means to yieldably maintain the carrier in its first position and effect the second position thereof.

15. The support of claim 14 in which the spring means are attached to the carrier and to the housing.

16. The support of claim 14 in which the power operated means is a solenoid.

17. The support of claim 14 in which the power operated means is a fluid pressure operated unit.

References Cited

UNITED STATES PATENTS

| 3,425,887 | 2/1969 | Bowen | 156—518 |
| 3,442,734 | 5/1969 | Ericsson | 156—530 |
| 3,455,769 | 6/1969 | Way | 156—530 |

SAMUEL FEINBERG, Primary Examiner

J. V. DORAMUS, Assistant Examiner

U.S. Cl. X.R.

156—261